US011451692B2

(12) United States Patent
Xu et al.

(10) Patent No.: US 11,451,692 B2
(45) Date of Patent: Sep. 20, 2022

(54) SYSTEMS AND METHODS FOR SECURE VIDEO DEVICES (71) Applicant: Roo, Inc., New York, NY (US)

(72) Inventors: Jingren Xu, New York, NY (US); Maximus Yaney, New York, NY (US); Dhruv Garg, Honolulu, HI (US)

(73) Assignee: Roo, Inc., New York, NY (US)

( * ) Notice: Subject to any disclaimer, the term of this patent is extended or adjusted under 35 U.S.C. 154(b) by 0 days.

(21) Appl. No.: 16/657,214

(22) Filed: Oct. 18, 2019

(65) Prior Publication Data

US 2021/0120157 A1   Apr. 22, 2021

(51) Int. Cl.
*H04N 5/225* (2006.01)
*G02F 1/137* (2006.01)
*G06F 21/84* (2013.01)

(52) U.S. Cl.
CPC .......... *H04N 5/2257* (2013.01); *G02F 1/137* (2013.01); *G06F 21/84* (2013.01); *H04N 5/2253* (2013.01); *H04N 5/2254* (2013.01)

(58) Field of Classification Search
CPC .. H04N 5/2257; H04N 5/2253; H04N 5/2254; G02F 1/137; G06F 21/84
USPC ....................................................... 348/373
See application file for complete search history.

(56) References Cited

U.S. PATENT DOCUMENTS

| | | | |
|---|---|---|---|
| 5,240,636 A | 8/1993 | Doane et al. | |
| 5,519,522 A | 5/1996 | Fergason | |
| 5,680,185 A | 10/1997 | Kobayashi et al. | |
| 5,686,017 A | 11/1997 | Kobayashi et al. | |
| 5,867,238 A | 2/1999 | Miller et al. | |
| 5,949,474 A * | 9/1999 | Gerszberg | H04N 7/141 348/E7.078 |
| 6,261,659 B1 | 7/2001 | Kobayashi et al. | |
| 6,294,258 B1 | 9/2001 | Gentile | |
| 6,306,469 B1 | 10/2001 | Serbutoviez et al. | |
| 6,621,766 B2 | 9/2003 | Brewer et al. | |
| 6,639,578 B1 | 10/2003 | Comiskey et al. | |
| 6,866,887 B1 | 3/2005 | Chen et al. | |

(Continued)

FOREIGN PATENT DOCUMENTS

WO    WO2017/075459 A1    5/2017

OTHER PUBLICATIONS

International Search Report of the International Searching Authority dated Nov. 18, 2020, issued in connection with International Application No. PCT/US2020/056313 (3 pages).

(Continued)

*Primary Examiner* — Pritham D Prabhakher
(74) *Attorney, Agent, or Firm* — McCarter & English, LLP (57) ABSTRACT

Systems and methods for secure video devices are provided. A video device includes a privacy module that can be automatically or manually activated to obscure the field of view of the video device. The video device also includes a visual indicator for indicating when the camera has been activated, in order to alert individuals within view of the camera that the camera is active. The system can automatically detect when a privacy breach occurs (e.g., if an unauthorized user gains access to the camera) and can automatically activate the privacy module in response to the detected privacy breach in order to obscure the field of view of the camera and maintain the privacy of individuals within the field of view of the camera.

13 Claims, 12 Drawing Sheets

(56) References Cited

U.S. PATENT DOCUMENTS

| | | | |
|---|---|---|---|
| 6,932,090 B1* | 8/2005 | Reschke | G02C 5/001 |
| | | | 128/897 |
| 6,992,731 B1 | 1/2006 | Morris | |
| 7,098,887 B2 | 8/2006 | Rezania | |
| 7,166,851 B2 | 1/2007 | Sharma | |
| 7,523,856 B2 | 4/2009 | Block et al. | |
| 7,557,875 B2 | 7/2009 | Majumdar et al. | |
| 7,639,571 B2 | 12/2009 | Ishii et al. | |
| 7,659,595 B2 | 2/2010 | Masutani et al. | |
| 7,667,786 B2 | 2/2010 | Nouchi et al. | |
| 8,187,493 B2 | 5/2012 | Duponchel et al. | |
| 8,223,217 B2 | 7/2012 | Shurboff | |
| 8,537,308 B2 | 9/2013 | Hwang et al. | |
| 8,677,515 B2 | 3/2014 | Ishihara et al. | |
| 8,692,969 B2 | 4/2014 | Jang et al. | |
| 8,988,532 B2* | 3/2015 | Soffer | G06F 21/83 |
| | | | 348/207.1 |
| 9,179,105 B1* | 11/2015 | Zeira | H04N 5/23206 |
| 9,571,708 B2* | 2/2017 | Haddad | G03B 9/08 |
| 9,854,142 B2* | 12/2017 | Freeze | H04N 5/2254 |
| 9,871,974 B2* | 1/2018 | Robinson | G06F 3/167 |
| 10,270,804 B2* | 4/2019 | Niemela | H04L 63/145 |
| 10,306,125 B2* | 5/2019 | Zeira | H04N 5/23203 |
| 10,306,129 B1* | 5/2019 | Bentley | H04N 5/23206 |
| 10,382,660 B2* | 8/2019 | Files | H04N 5/2257 |
| 10,419,419 B2* | 9/2019 | Kaplan | H04L 63/126 |
| 10,455,670 B2* | 10/2019 | Zeira | H04L 12/4625 |
| 10,509,298 B2 | 12/2019 | Yaney et al. | |
| 10,509,912 B2* | 12/2019 | Sukhomlinov | G06F 21/6245 |
| 10,930,452 B2* | 2/2021 | Weaver | G06F 1/1686 |
| 2003/0134460 A1 | 7/2003 | Forbes et al. | |
| 2009/0174918 A1 | 7/2009 | Zhuang et al. | |
| 2009/0189981 A1 | 7/2009 | Siann | |
| 2010/0208169 A1 | 8/2010 | Mun et al. | |
| 2011/0199563 A1 | 8/2011 | Fontecchio et al. | |
| 2013/0222609 A1* | 8/2013 | Soffer | G06F 21/81 |
| | | | 348/207.1 |
| 2014/0085574 A1 | 3/2014 | Kashima et al. | |
| 2014/0141683 A1 | 5/2014 | Zhou | |
| 2016/0105598 A1* | 4/2016 | Zeira | H04N 5/2252 |
| | | | 348/143 |
| 2016/0105644 A1* | 4/2016 | Smith | G08B 29/185 |
| | | | 348/159 |
| 2016/0363806 A1 | 12/2016 | Sinderbrand et al. | |
| 2017/0115545 A1 | 4/2017 | Yaney et al. | |
| 2018/0316835 A1* | 11/2018 | Files | G06V 10/141 |
| 2019/0018305 A1* | 1/2019 | Gahche | G03B 11/041 |
| 2019/0042769 A1* | 2/2019 | Sukhomlinov | G06F 21/6245 |
| 2019/0215426 A1* | 7/2019 | Ko | G06F 3/042 |
| 2019/0274208 A1* | 9/2019 | Zeira | H04L 12/4625 |
| 2020/0293003 A1* | 9/2020 | Lin | G04G 13/02 |
| 2021/0200294 A1* | 7/2021 | Tam | H04M 1/72463 |

OTHER PUBLICATIONS

Written Opinion of the International Searching Authority dated Nov. 18, 2020, issued in connection with International Application No. PCT/US2020/056313 (5 pages).

Muno A. Vaz, et al., A Light Control Film Composed of Liquid Crystal Droplets Dispersed in an Epoxy Matrix, Molecular Crystals and Liquid Crystals, 1987, pp. 17-34, vol. 146, Issue 1, Gordon and Breach Science Publishers, USA (16 pages).

Office Action dated Aug. 8, 2018, issued in connection with U.S. Appl. No. 15/244,632 (8 pages).

Jeremy M. Wofford, et al., Holographic Polymer Dispersed Liquid Crystal (HPDLC) Transmission Gratings Formed by Invisible Light Initiated THIOL-ENE Photopolymerization (Postprint), Oct. 2006, Conference paper published in Proceedings of SPIE, vol. 6332, USA (6 pages).

Chunye Xu, et al., Switchable Window Based on Electrochromic Polymers, Jul. 2004, J. Mater. Res., vol. 19, No. 7. (9 pages).

Notice of Allowance dated Oct. 17, 2019, issued in connection with U.S. Appl. No. 15/259,675 (7 pages).

Office Action dated Jul. 23, 2019, issued in connection with U.S. Appl. No. 15/259,675 (13 pages).

Office Action dated Sep. 19, 2018, issued in connection with U.S. Appl. No. 15/259,675 (9 pages).

International Search Report of the International Searching Authority dated Nov. 27, 2017, issued in connection with International Application No. PCT/IB2017/001219 (5 pages).

Written Opinion of the International Searching Authority dated Nov. 27, 2017, issued in connection with International Application No. PCT/IB2017/001219 (5 pages).

* cited by examiner

SYSTEMS AND METHODS FOR SECURE VIDEO DEVICES

BACKGROUND

Technical Field

The present disclosure relates generally to the field of video devices. More specifically, the present disclosure relates to systems and methods for secure video devices.

Related Art

In today's world, video capture devices such as digital cameras, are present in numerous devices. For example, Internet-enabled video cameras capture videos and still images and can transmit same to remote devices, such as remote computers, smart cellular phones, etc. Indeed, in the current era of Internet-of-Things enabled devices, the transmission of digital images and video streams by such devices is pervasive.

A particular security issue that has arisen with Internet-enabled video devices is vulnerability to security breaches. Indeed, unauthorized individuals (such as hackers) can often gain access to Internet-enabled video devices. Frequently, such intrusions are undetected, and represent a major security concern. As such, there is a need to not only secure Internet-enabled video devices from unauthorized access (e.g., automatically when a breach has been detected, or whenever an individual desires to secure such devices, such as before the occurrence of a meeting or event within view of a camera), but to also alert individuals to the occurrence of such events. Still further, it would be beneficial to allow for easy access and control of security features of video devices using commonly-available computing devices such as smart phones, laptop computers, desktop computers, etc., over a network connection such as the Internet. Accordingly, the systems and methods of the present disclosure address these and other needs.

SUMMARY

The present disclosure relates to systems and methods for secure video devices. An Internet-connected video device such as a video camera or still camera is provided. The video device includes a privacy module that can be automatically or manually activated to obscure the field of view of the video device. The video device also includes a visual indicator for indicating when the camera has been activated, in order to alert individuals within view of the camera that the camera is active. The system can automatically detect when a privacy breach occurs (e.g., if an unauthorized user gains access to the camera) and can automatically activate the privacy module in response to the detected privacy breach in order to obscure the field of view of the camera and maintain the privacy of individuals within the field of view of the camera. The camera could include a pivotable mount for easy installation and mounting of the camera at a desired location, and could also include an intergral wireless transceiver for wireless connection to a network, such as a WiFi network, a Bluetooth network, a cellular data network, etc. The privacy module could include a polymer-dispersed liquid crystal (PDLC module) and associated drive circuitry for driving the PDLC module.

BRIEF DESCRIPTION OF THE DRAWINGS

The foregoing features of the invention will be apparent from the following Detailed Description of the Invention, taken in connection with the accompanying drawings, in which:

FIG. 5 is an exploded view illustrating components of the front cover module of the video device;

DETAILED DESCRIPTION

The present disclosure relates to systems and methods for secure video devices, as described in detail below in connection with FIGS. 1-12.

Figure 1:
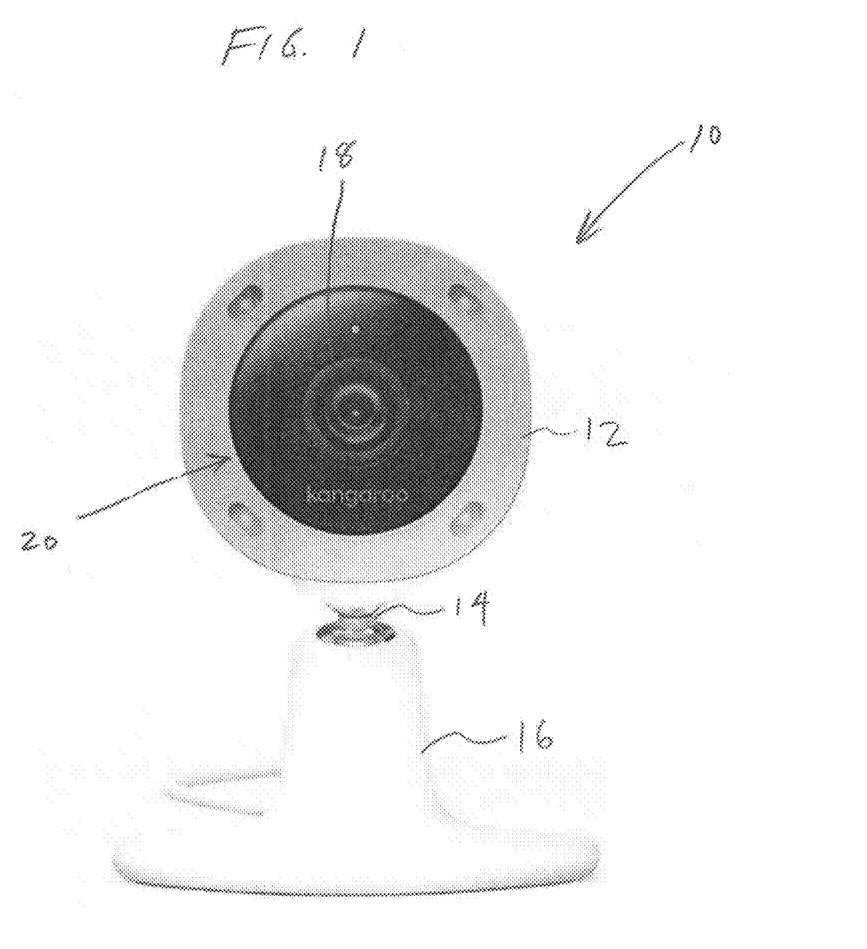
FIG. 1 is a front view of the video device of the present disclosure.

FIG. 1 is a front view of the video device of the present disclosure, indicated generally at 10. The video device 10 includes a camera module 12, a pivotable mount 14, a base 16, a camera 18, and a privacy module 20. The camera 18 could include a video camera, a still camera, or a combination of the two. As will be discussed in greater detail below, the privacy module 20 can obscure the field of view of the camera 18 so as to protect the privacy of individuals within the field of view of the camera 18. The privacy module 20 could be removably attachable to the camera 18 or formed integrally therewith. The video device 10 is an Internet-enabled device which can communicate with one or more remote devices, using a wired or wireless connection.

Figure 2:
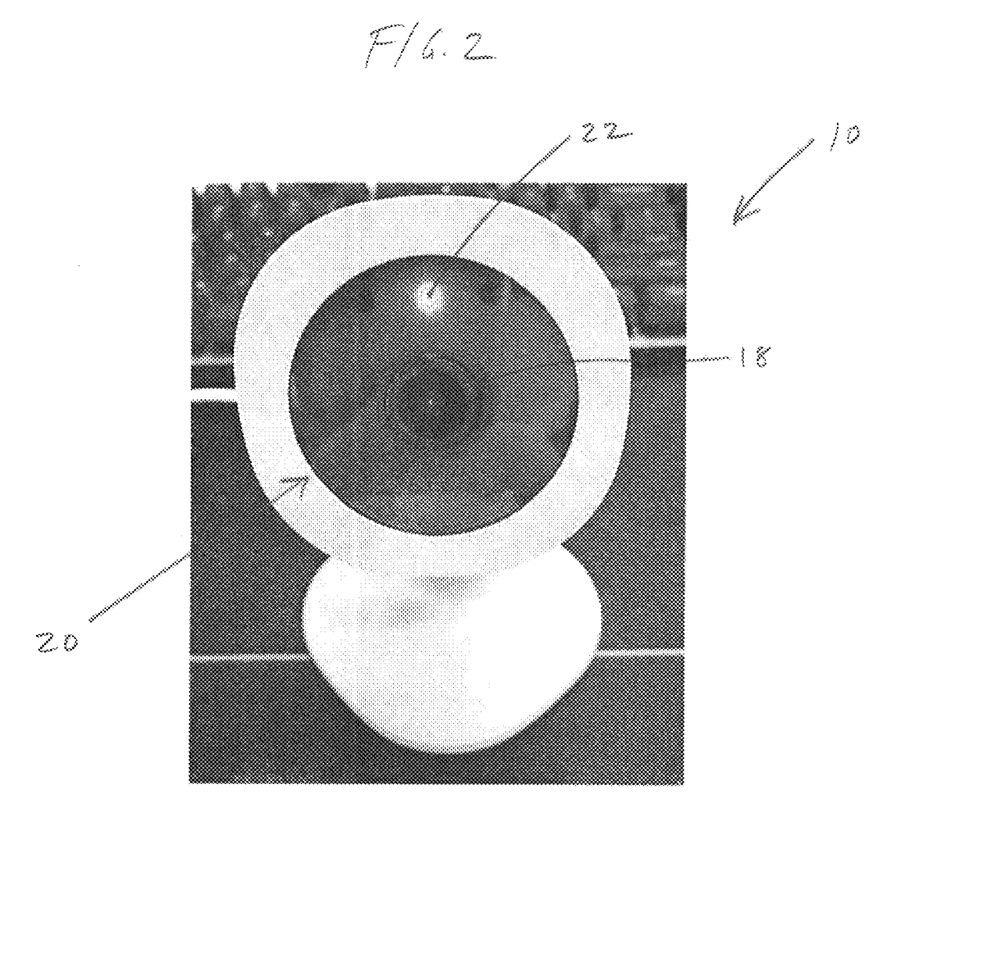
FIG. 2 is a perspective view of the video device of the present disclosure, wherein a visual indicator of the video device indicates that the camera of the video device is active.

FIG. 2 is a perspective view of the video device 10 of the present disclosure, wherein a visual indicator 22 of the video device 10 indicates that the camera 18 of the video device 10 is active. The visual indicator 22 could be a light-emitting diode, an incandescent light, or other type of visual indicator. Advantageously, when the visual indicator 22 is illuminated, it provides a visual indication that the camera 18 is active, thereby alerting individuals within the field of view of the camera 18 that their privacy may be compromised. Such a visual indication may prompt such individuals to leave the field of view of the camera 18, if desired, so as to maintain privacy.

Figure 3:
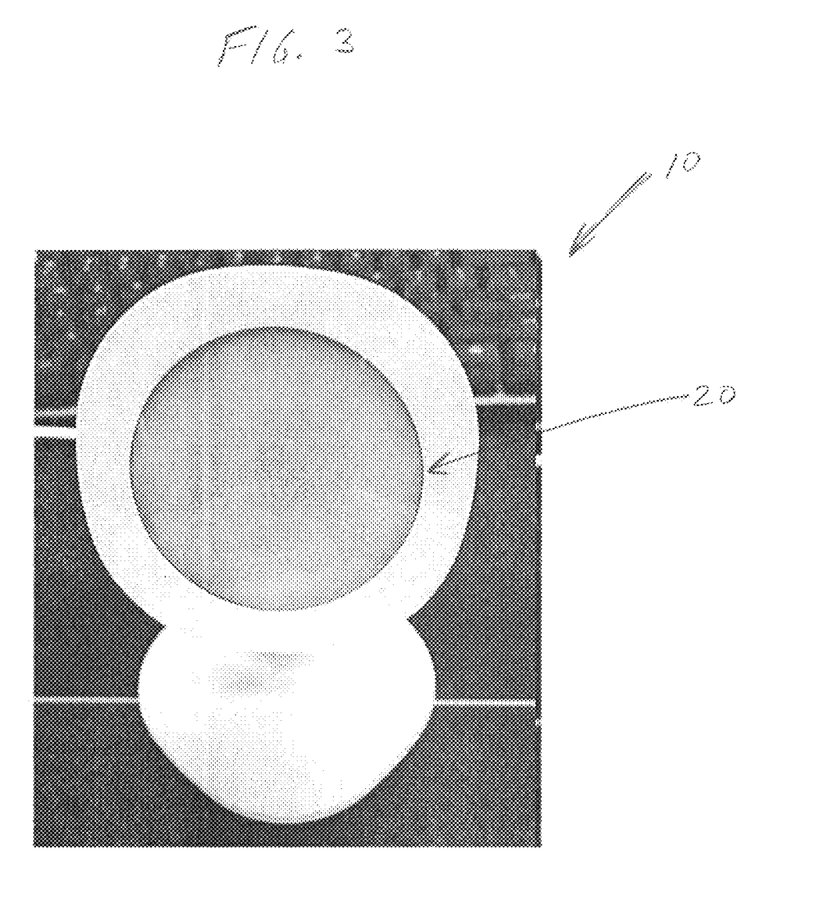
FIG. 3 is a perspective view of the video device of the present disclosure, wherein the privacy module has been activated and the field of view of the camera is obscured so as to provide privacy.

FIG. 3 is a perspective view of the video device 10 of the present disclosure, wherein the privacy module 20 has been activated and the field of view of the camera 18 is obscured so as to provide privacy. As can be seen, the privacy module 20, when activated, is opaque and prevents the camera 18 from capturing images or video, thereby protecting the privacy of individuals within the field of view of the camera 18. As will be discussed in detail below, the privacy module could include a PDLC device, electrochromic glass, or other suitable component that turns opaque and/or darkens when electrical power is applied, in order to obscure the field of view of the camera 18. Such a feature could be activated by the video device 10 automatically (e.g., in response to detection by the system of an unauthorized access to the video device 10 by a hacker), or manually (e.g., by a user selectively activating the privacy module 20 using one or more remote devices such as a smart phone, computer system, etc.).

Figure 4:
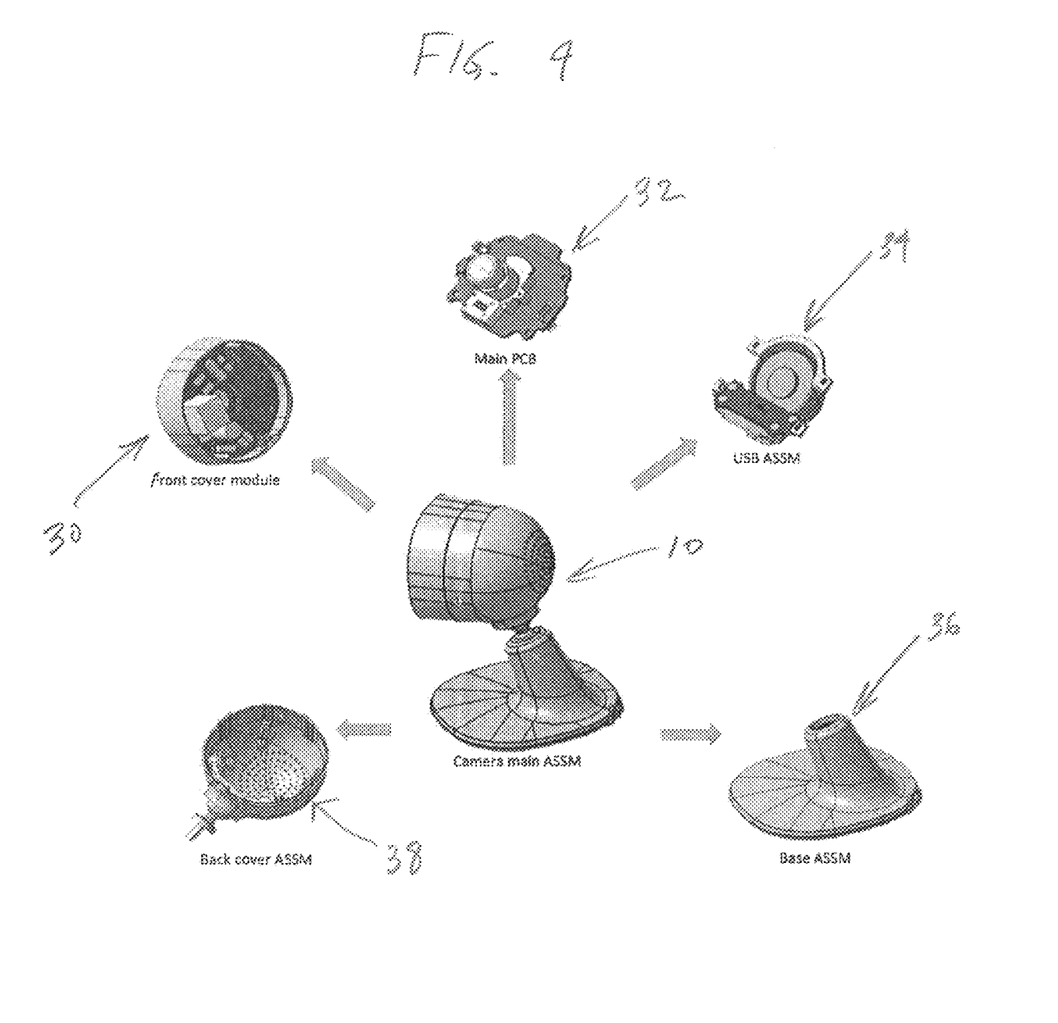
FIG. 4 is a diagram illustrating component parts of the video device of the present disclosure.

FIG. 4 is a diagram illustrating component parts of the video device 10 of the present disclosure. The video device 10 includes a front cover module 30, a main printed circuit board (PCB) assembly 32, a power and data connection (e.g., universal serial bus (USB)) assembly 34, a base assembly 36, and a back cover assembly 38. Each of these component parts is described in further detail below.

FIG. 5 is an exploded view illustrating components of the front cover module 30 of the video device. The front cover module 30 includes a bezel 40, a sealing gasket 32 (for providing a seal with the camera 18), a microphone 44, a PDLC module 46, conductive gaskets 48 for sealing the PDLC module 46, an infrared (IR) mask sheet 50, an IR lens 52, a plurality of springs 54, and a light guide (LG) 56, a light PCB 58, and a plurality of screws 60 for fastening the light PCT to the IR lens. The IR mask sheet 50 and IR lens 52 are positioned in front of the IR light-emitting diodes (LEDs) to filter, focus, and direct IR light exiting the camera. The IR LEDs can be used in low light conditions (e.g., night vision) to illuminate the subject area for the camera sensor. The front cover module 30 is connected by a cable 62 to the main PCB 32, which includes the camera 18, so as to provide an electrical connection between both components.

Figure 6:
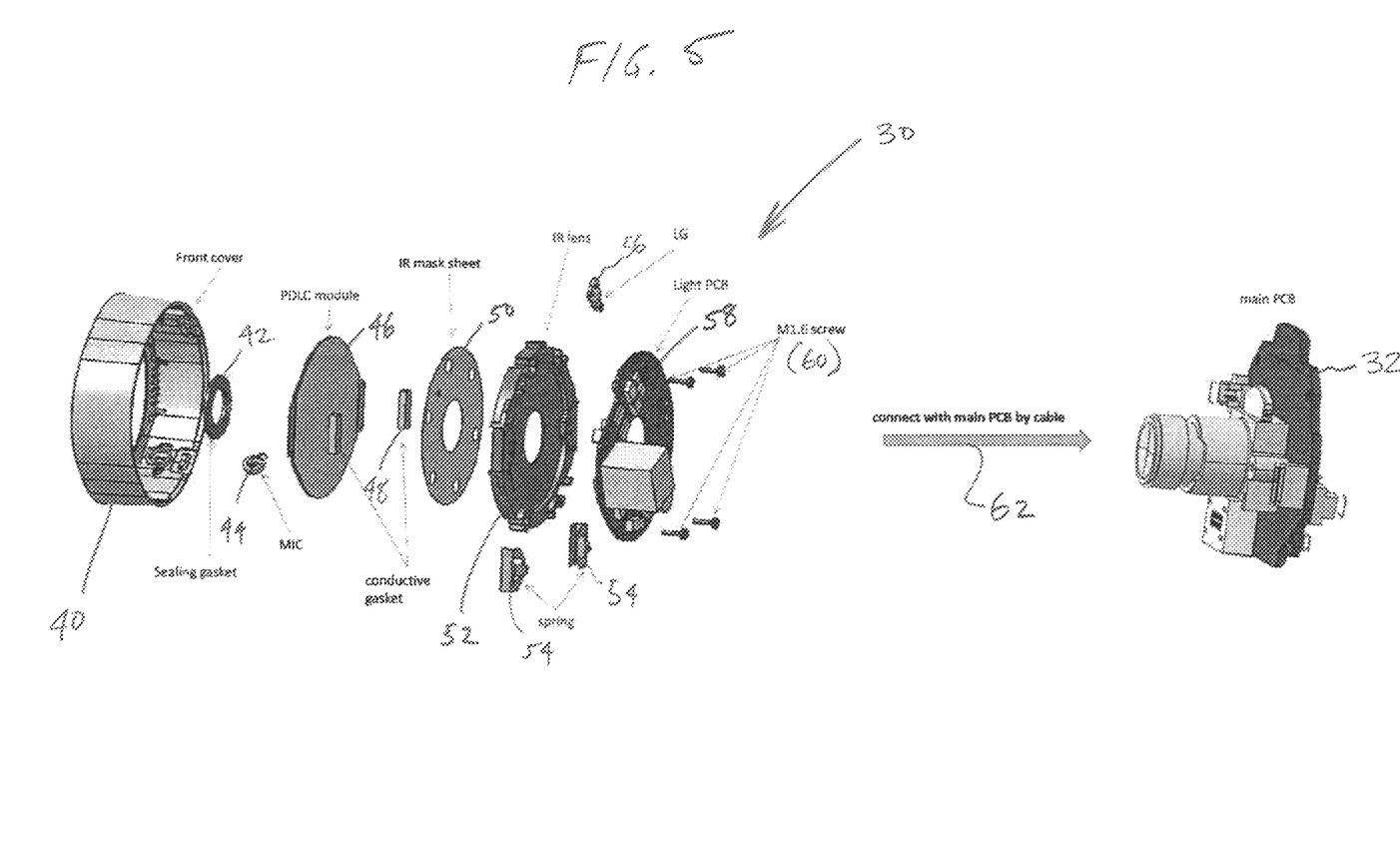
FIG. 6 is an exploded view illustrating components of the universal serial bus (USB) subassembly of the video device.

FIG. 6 is an exploded view illustrating components of the power and data connection subassembly 34 of the video device 10. The subassembly 34 includes a USB cover 80, a speaker 82, an adhesive gasket 84, a USB PCB 86, and a plurality of screws 88 for fastening the USB PCB 86 to the cover 80. The speaker 82 generates audio/sounds that can be heard by individuals in proximity to the video device 10. The USB PCB 86 allows for wired communication of the video device 10 with another device using a USB communications protocol as is known in the art. Of course, other types of wired communications could be provided, such as Ethernet or serial communications (e.g., RS-232, RS-485, etc.).

Figure 7:
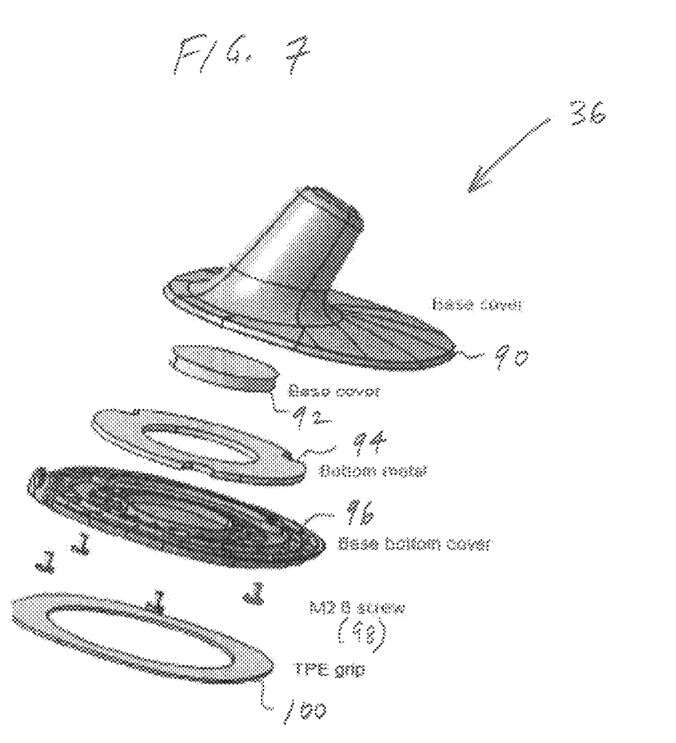
FIG. 7 is an exploded view illustrating components of the base cover of the video device.

FIG. 7 is an exploded view illustrating components of the base cover 36 of the video device 10. The base cover 36 includes an outer cover portion 90, an internal plate 92, a bottom metal plate 94, a bottom cover 96, a plurality of screws 98 for fastening the bottom cover 96 to the cover 90, and a thermoplastic elastomer (TPE) grip 100 for allowing the video device 10 to grip a surface on which the video device 10 is positioned.

Figure 8:
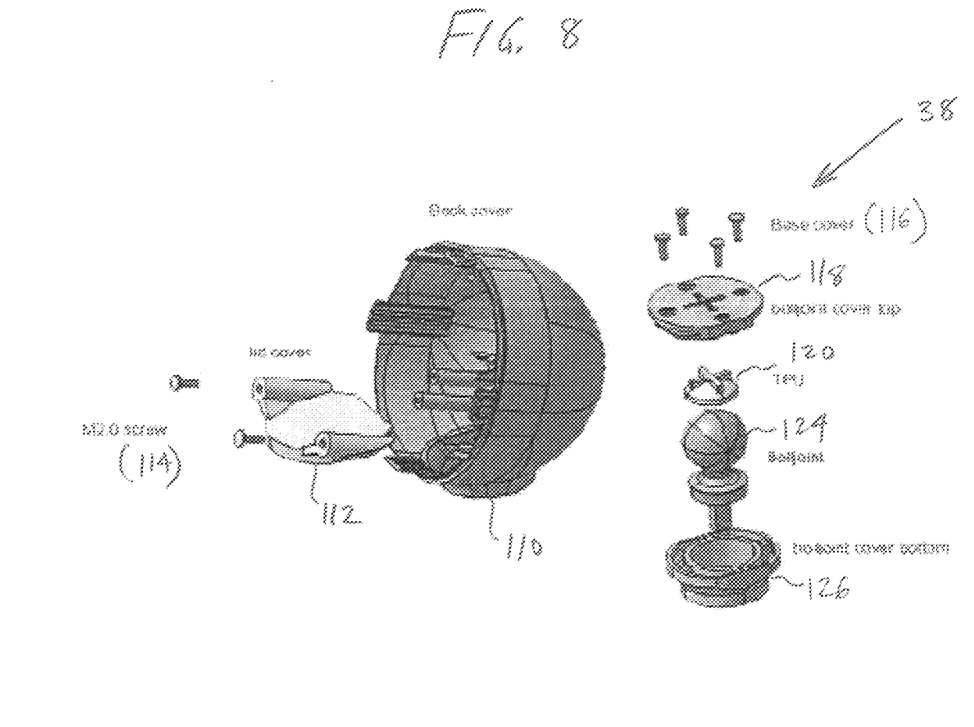
FIG. 8 is an exploded view illustrating components of the back cover of the video device.

FIG. 8 is an exploded view illustrating components of the back cover 38 of the video device 10. The back cover 38 includes a cover portion 110, a lid cover 112, a plurality of screws 114 for mounting the lid cover 112 to the cover portion 110, a ball joint cover top 118, a TPU component 120 (which holds the ball joint 124 in place via a friction fit and allows the cover portion 110 to rotate smoothly, a ball joint 124, a bottom ball joint cover 126, and a plurality of screws 116 for mounting the cover top 118 to the bottom cover 126. Advantageously, the ball joint 124 allows the video device 10 to be pointed at a desired angle to capture video and/or still images.

Figure 9:
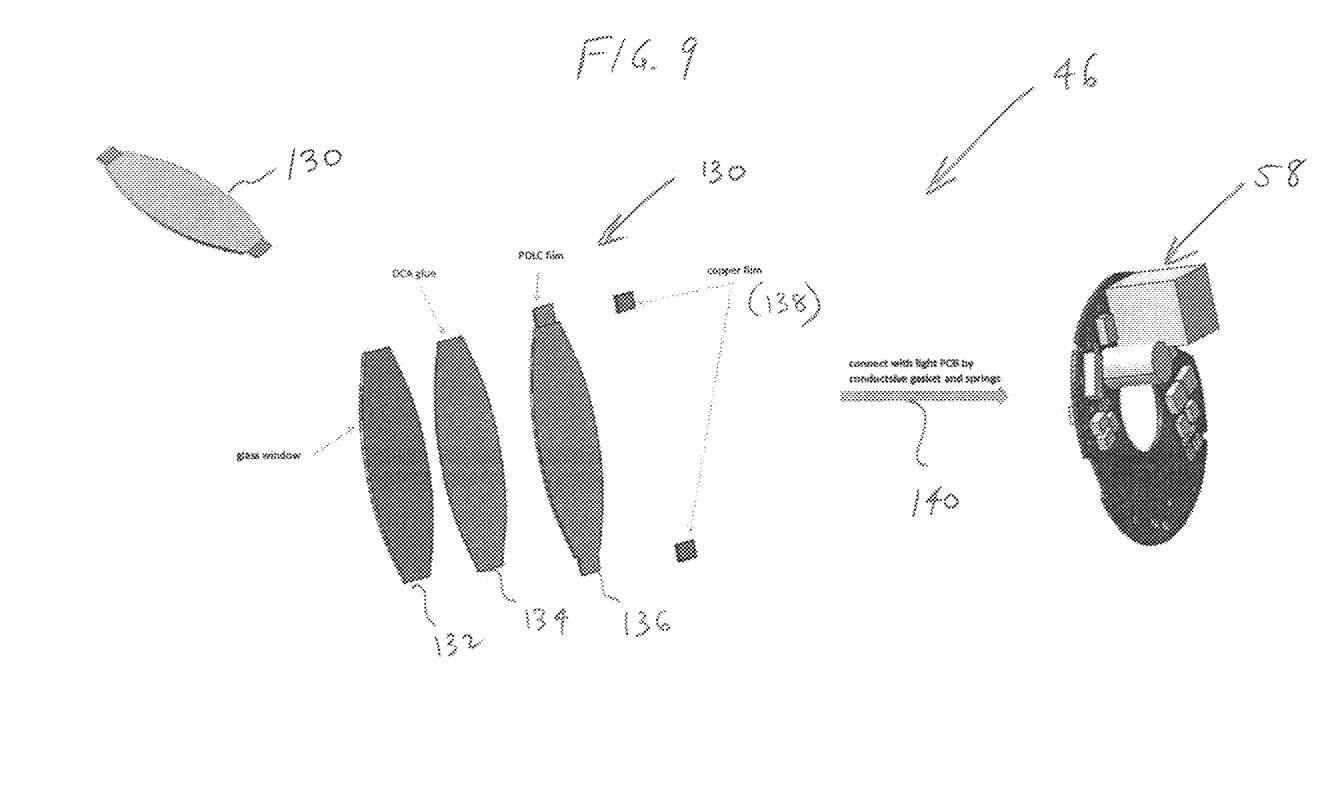
FIG. 9 is an exploded view illustrating components of the PDLC module of the video device.

FIG. 9 is an exploded view illustrating components of the PDLC module 46 of the video device 18. The PDLC module 46 includes a PDLC wafer 130 that can be activated by an appropriate electrical signal so that the wafer 130 turns opaque or translucent in order to obscure the field of view of the camera 18 and to prevent the camera 18 from taking unauthorized still images or videos. The PDLC wafer 130 includes a glass window 132, an optically-clear adhesive (OCA) layer 134, and a PDLC film layer 136. The OCA layer adheres the glass window 132 to the film layer 136. A copper film 138 provides electrical connections to the PDLC film layer 138. The PDLC wafer 130 is mechanically and electrically connected to the light PCB 58 by a gasket and springs (diagrammatically illustrated as element 140 in FIG. 9).

Figure 10:
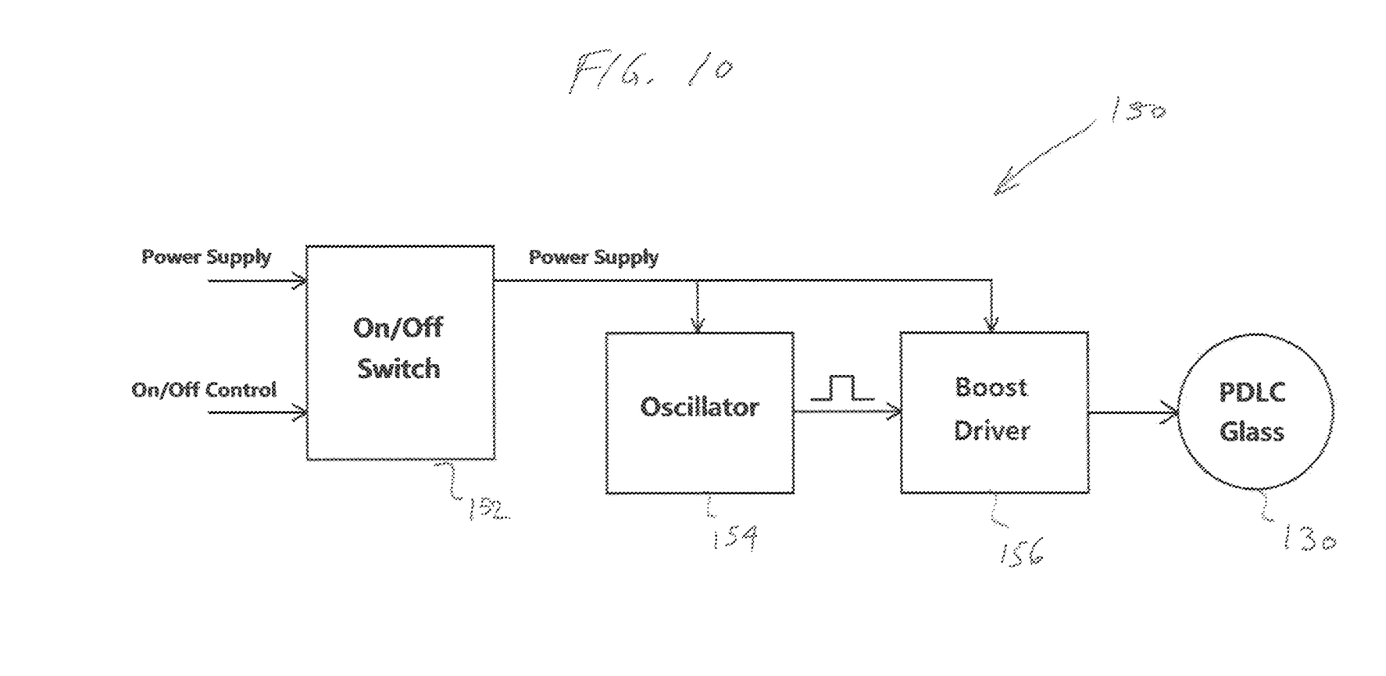
FIG. 10 is a block diagram illustrating drive circuitry for the PDLC module of the video device.

FIG. 10 is a block diagram illustrating drive circuitry, indicated generally at 150, for the PDLC module 46 of the video device 18. The drive circuitry 150 includes an on/off switch 152 for selectively applying power from a power supply, an oscillator 154 that generates a square wave (or other appropriate wave) signal, and a boost driver 156. The boost driver 156 applies the square wave signal (or other appropriate signal) to the PDLC wafer 130 in order to activate the device, causing the wafer 130 to turn opaque or translucent and to thereby obscure the camera 18.

Figure 11:
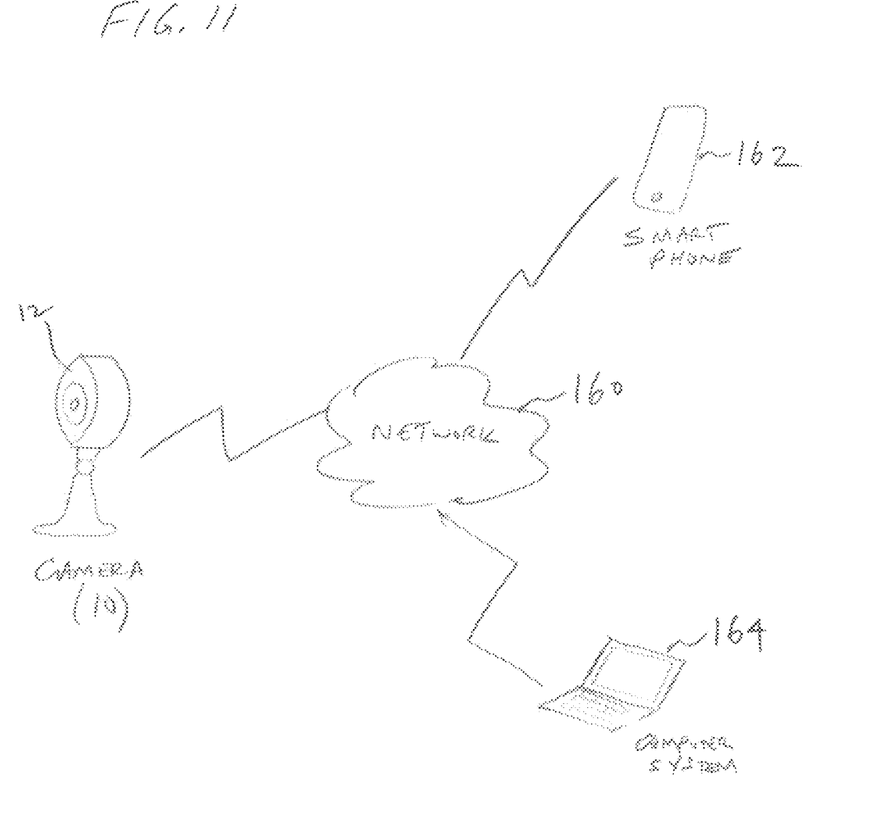
FIG. 11 is a diagram illustrating communications of the video device of the present disclosure with one or more computing devices.

FIG. 11 is a diagram illustrating communications of the video device 10 of the present disclosure with one or more computing devices, such as a smart phone 162 or a computer system 164 over a network 160. The network 160 could include a wired or wireless network, including the Internet, a local WiFi network, a Bluetooth network, a wide-area network (WAN), a local area network (LAN), a radio network, a mesh network, or other suitable type of network. The smart phone 162 and computer system 164 could each activate the privacy module 20 of the video device 10, automatically in response to a detected privacy breach (e.g., in the event of a detected hacking into the video device 10 by an unauthorized user) or manually as desired by a user of the smart phone 162 or the computer system 164. Further, both the smart phone 162 and the computer system 164 could receive video and/or audio signals captured by the video device 10.

Figure 12:
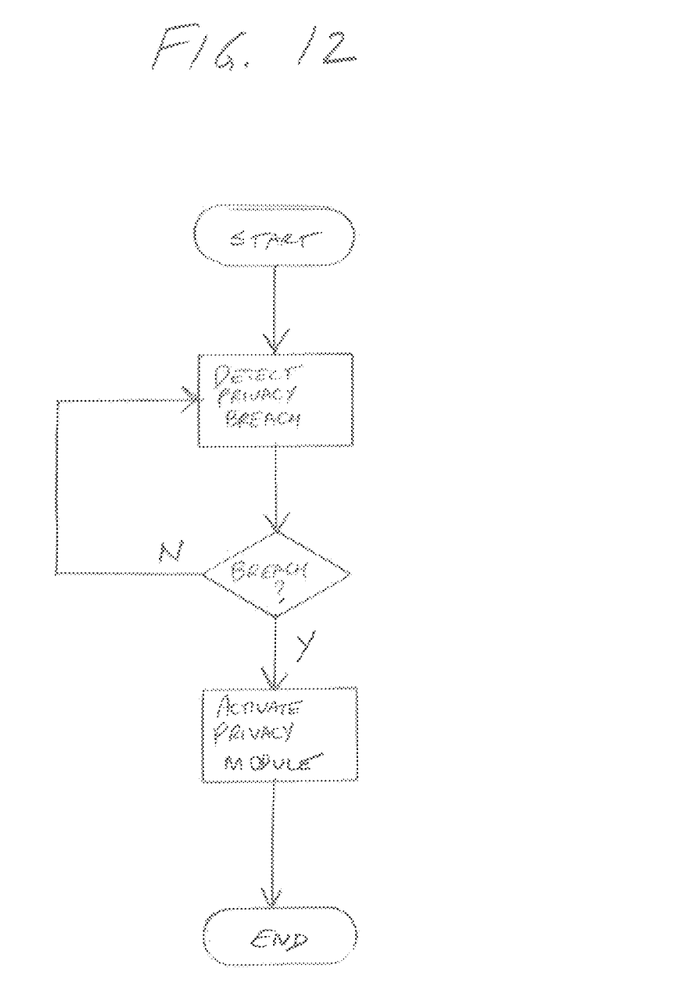
FIG. 12 is flowchart illustrating processing steps carried out by the system of the present disclosure.

FIG. 12 is flowchart illustrating processing steps carried out by the system of the present disclosure. As noted above, the system could include the ability to automatically detect unauthorized access to the video device 10, and activation of the privacy module 20 to protect the privacy of individuals in proximity to the video device 10. As shown in FIG. 12, the system first detects a privacy breach. Then, the system determines whether a breach has occurred. If so, the system activate the privacy module 20 to protect the privacy of individuals near the video device 10. The logic of FIG. 12 could be programmed into and carried out by the video device 10 (e.g., as software code executed by a processor of the video device 12), or by one or more remote devices such as a smart phone or a computer system in communication with the video device 10.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is intended to be protected by Letter Patent is set forth in the following claims.

What is claimed is:

1. A secure video device, comprising:
a camera for capturing video or still images; and
a privacy module coupled to the camera and in communication with a computing device,
wherein the computing device detects unauthorized access to the camera by an unauthorized user attempting to electronically access the camera and, in response to detection of unauthorized access, activates the privacy module to obscure the field of view of the camera to secure the camera;
wherein the privacy module includes a polymer-dispersed liquid crystal (PDLC) module with a PDLC wafer, the PDLC wafer including a glass window layer, an optically-clear adhesive (OCA) layer, a PDLC film layer, and copper film contacts; and
wherein the PDLC wafer is mechanically and electrically connected to a printed circuit board (PCB) of the privacy module by way of one or more conductive gaskets and springs.

2. The video device of claim 1, wherein the privacy module further comprises drive circuitry for driving the PDLC module.

3. The video device of claim 2, wherein the drive circuitry comprises one or more switches for selectively applying power to the PDLC module, an oscillator, and a boost driver.

4. The video device of claim 1, wherein the computing device comprises a smart phone or a remote computer system.

5. The video device of claim 1, wherein the privacy module is in wireless communication with the computing device.

6. The video device of claim 1, wherein the privacy module further comprises a visual indicator that illuminates when the camera is active.

7. The video device of claim 1, further comprising a pivotable mount for pivotably mounting the video device to a surface.

8. The video device of claim 1, wherein the privacy module is removably mounted to the camera.

9. The video device of claim 1, wherein the camera illuminates a subject area using infrared light when the camera is active.

10. A method for securing a video device, comprising:
detecting at a computing system in communication with a camera and a privacy module unauthorized access to the camera by an unauthorized user attempting to electronically access the camera; and
in response to detection of unauthorized access to the camera, activating the privacy module to obscure the field of view of the camera to secure the camera;
wherein the privacy module includes a polymer-dispersed liquid crystal (PDLC) module with a PDLC wafer, the PDLC wafer including a glass window layer, an optically-clear adhesive (OCA) layer, a PDLC film layer, and copper film contacts; and
wherein the PDLC wafer is mechanically and electrically connected to a printed circuit board (PCB) of the privacy module by way of one or more conductive gaskets and springs.

11. The method of claim 10, further comprising illuminating a visual indicator of the privacy module when the camera is active.

12. The method of claim 10, further comprising illuminating a subject area using infrared light when the camera is active.

13. The method of claim 10, wherein the step of activating the privacy module further comprises activating the PDLC module to obscure the field of view of the camera.

* * * * *

UNITED STATES PATENT AND TRADEMARK OFFICE
CERTIFICATE OF CORRECTION

| | |
|---|---|
| PATENT NO. | : 11,451,692 B2 |
| APPLICATION NO. | : 16/657214 |
| DATED | : September 20, 2022 |
| INVENTOR(S) | : Xu et al. |

It is certified that error appears in the above-identified patent and that said Letters Patent is hereby corrected as shown below:

On the Title Page

On page 2, item (56) under the References Cited Other Publications Column, the second reference down the second column, the inventor's name "Muno" should be deleted and replaced with the word "Nuno".

Signed and Sealed this
Twenty-eighth Day of February, 2023

*Katherine Kelly Vidal*

Katherine Kelly Vidal
*Director of the United States Patent and Trademark Office*